(No Model.)
G. W. DUTTON.
TWO WHEELED VEHICLE.
No. 274,183. Patented Mar. 20, 1883.
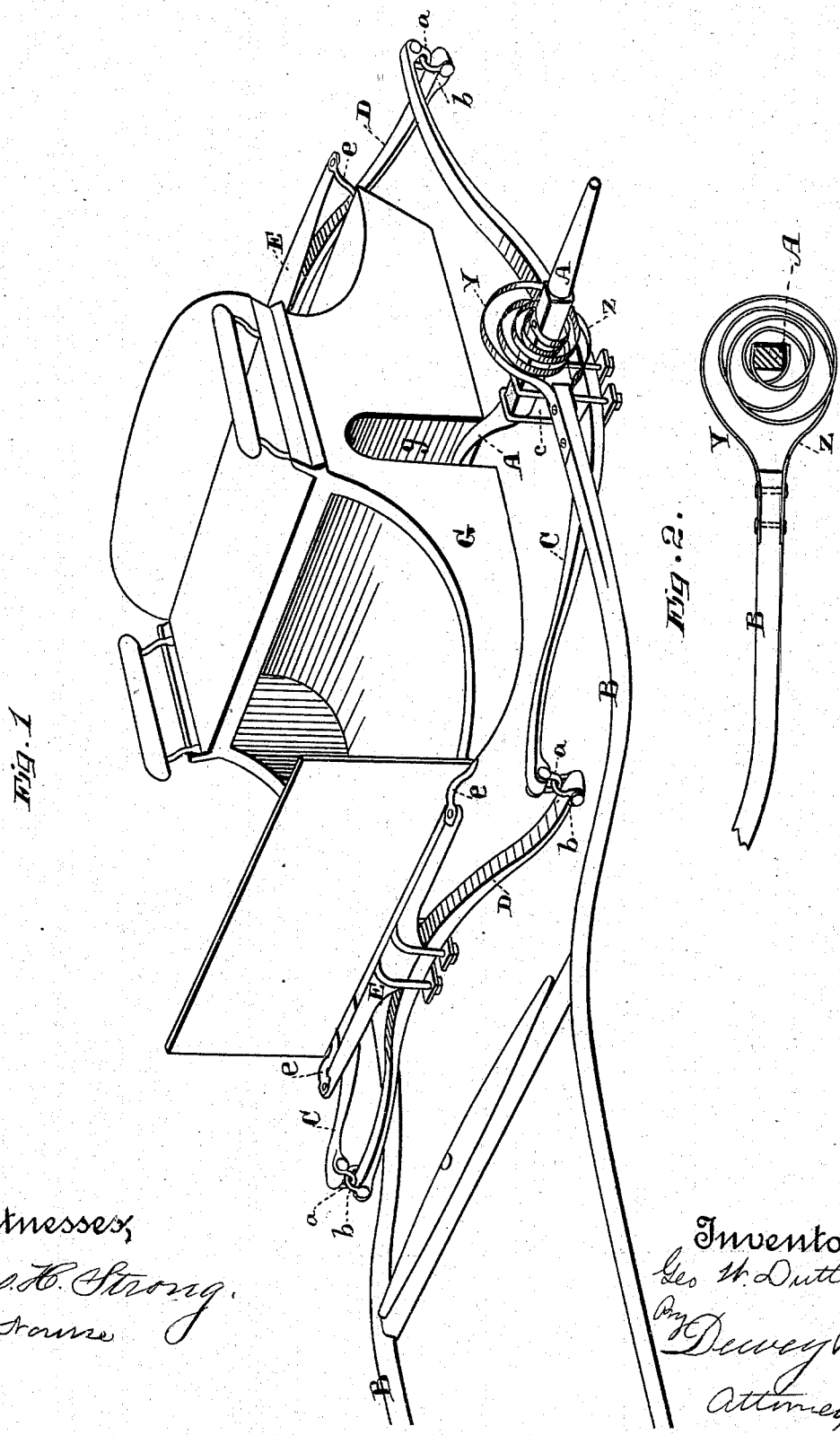
Witnesses,
Geo. H. Strong.
J. A. Strauss
Inventor,
Geo. W. Dutton
By Dewey & Co.
Attorneys

UNITED STATES PATENT OFFICE.

GEORGE W. DUTTON, OF TOMALES, CALIFORNIA, ASSIGNOR OF TWO-THIRDS TO LOUIS GULDAYER AND M. L. MURPHY, OF SAME PLACE.

TWO-WHEELED VEHICLE.

SPECIFICATION forming part of Letters Patent No. 274,183, dated March 20, 1883.

Application filed October 21, 1882. (No model.)

*To all whom it may concern:*

Be it known that I, GEORGE W. DUTTON, of Tomales, county of Marin, State of California, have invented an Improved Two-Wheeled Vehicle; and I hereby declare the following to be a full, clear, and exact description thereof.

My invention relates to the class of two-wheeled vehicles, and to certain improvements therein having for their object the prevention of the unpleasant motion which is usually transmitted to the seat by reason of the jogging motion of the horse.

A further object is to provide a convenient and comfortable vehicle, easy on the horse and rider, and economical in construction; and to this end the invention consists in novel features of construction and combination and arrangement of parts, as will hereinafter appear, reference being made to the accompanying drawings, in which—

Figure 1 is a perspective view of my vehicle. Fig. 2 shows the springs for attaching the thills to the axle.

Let A represent the axle and B the shafts attached to the axle, each by two coil-springs, Y Z, coiled in opposite directions around and secured to the axle, as shown. The springs supporting the body and riders are of the class known as "platform-springs," the body of each spring being about the same as now made, but the points of novelty being in the means connecting them with each other and in the connection of the side ones with the axle.

C represents the side springs. These are clipped under the axle, and are set as low down by the intervention of suitable blocks, c, as practicable. The object of this is to get the points of resistance as low as possible, in order that the body which is sustained by the springs may be lowered with its bottom below the pivotal line, and thus rendered stable and unaffected to any extent by the movement of the shafts. Another object is to throw more weight on the horse's back in making ascents and less in making descents. To further these objects, the body itself, as I shall explain, is peculiarly located.

Under the ends of the side springs, C, are pivoted links or shackles a.

D are the end springs, having pivoted to their ends links b, inclosed in links a. By means of these links a and b the springs are held together. As far as I am aware, most springs of this nature are attached to each other by a link or shackle pivoted to both springs and adapted to give freedom to the springs only in a single direction, and no springs are attached at all the four corners by a double link, such as I have to give a motion in all directions; but that motion is what I here require, as I shall explain.

Upon the centers of the end springs, D, are clipped bars E, from the ends of which straps e extend underneath the body G from the front bars to the rear bar.

The axle A will be seen to extend across the center of the quadrilateral formed by the springs, and the body G, being hung between the springs, occupies horizontally a central position; but in order to center it as much as possible vertically, I make a recess, g, in its bottom, in which the axle A lies. This completes the vehicle.

Its advantage can readily be demonstrated. The shafts, when connected with the axle by the coil-springs, as shown, do not by their up-and-down motion cause the axle to rock as they would if they were immovably fastened to the axle; and the body is so connected with the axle by intermediate devices that by reason of the character of such devices by reason of the position of the body, and by reason of the coil-springs connecting shafts to axle, the up and-down motion of the shafts is not communicated to the body. The intermediate devices are the soft springs C D and the shackles a b. The body is made to hang as low down below the pivotal line as possible, thereby giving it stability by force of gravity. It is evident the body has the desired independence of motion, and is not forced to follow the movements of the shafts. It may remain steady because of its independence, and may move in any direction to counteract any motion to be imparted to it. As will be seen, the body is lowered below the pivotal line (axle) by clipping the side springs below the axle, by regulating the length of the iron straps on which the body is hung to the ends of the spring-bars, and by making a recess in the bottom of the body, in which recess the axle is received. The body has such stability in this position by force of gravity that the side springs, the front and rear springs, the shackles, and the double coil springs, connecting each shaft with the axle, yield sufficiently to save the body, and prevent it from receiving any of the unpleasant motion it is desired to avoid. An advantage in attaching the side springs below the pivotal line is, that in making ascents the weight on the horse's back is increased, and in making descents it is lessened. An advantage obtained by the shackles and springs, allowing the body to swing toward any point of the entire circle, is that the jostle to the rider (which is much greater in two-wheeled vehicles, as ordinarily constructed, than in four) from running over an obstruction with one wheel is moderated and eased off, as it were, by being lengthened and made less sudden.

Having thus described my invention, what I claim as new, and desire to secure by Letters Patent, is—

1. In a two-wheeled vehicle, the axle A, in combination with the shaft B and the coil-springs Y Z, coiled in opposite directions, for securing the shafts to the axle, substantially as herein described.

2. In a two-wheeled vehicle, the axle A, shafts B, and coil-springs Y Z, connecting the shafts and axle, in combination with the side springs, C, clipped at a point under the axle, the end springs, D, secured to the side springs by intervening links or shackles, $a\ b$, loosely fitting each other, and the body G, secured to and between the end springs, as shown, and having a transversely-recessed bottom, $g$, through which the axle passes, all arranged substantially as herein described.

In witness whereof I hereunto set my hand this 16th day of September, 1882.

GEORGE W. DUTTON.

Witnesses:
T. W. HOLLAND,
*THOS. J. ABLES.